Jan. 7, 1947.    N. R. GUNDERSON    2,413,706
APPARATUS FOR REPRODUCTION OF PICTORIAL REPRESENTATIONS
Filed Jan. 9, 1942    8 Sheets-Sheet 1

NORMAN R. GUNDERSON,
INVENTOR.
BY
ATTORNEY.

NORMAN R. GUNDERSON,
INVENTOR.

BY

ATTORNEY.

Norman R. Gunderson,
INVENTOR.

NORMAN R. GUNDERSON,
INVENTOR.

Jan. 7, 1947.  N. R. GUNDERSON  2,413,706
APPARATUS FOR REPRODUCTION OF PICTORIAL REPRESENTATIONS
Filed Jan. 9, 1942  8 Sheets-Sheet 8

NORMAN R. GUNDERSON,
INVENTOR.
BY
ATTORNEY.

UNITED STATES PATENT OFFICE 2,413,706

APPARATUS FOR REPRODUCTION OF PICTORIAL REPRESENTATIONS

Norman R. Gunderson, Glendale, Calif.

Application January 9, 1942, Serial No. 426,220

20 Claims. (Cl. 178—5.2)

The present invention relates to a device or system particularly adapted for use in the rapid, economical and accurate reproduction of photographs, colored transparencies, maps, or other pictorial representations, the reproductions being either in the form of prints or facsimiles for observation by reflected light or in the form of engraved plates from which other facsimiles may be printed, these various reproductions being of the same or different size than the original, and either in monochrome or in substantially natural color. The invention is adapted to wire or wireless transmission of pictorial representations and permits colored prints or reproductions to be sent by wire or wireless with an accuracy and definition which has not been approached even by existing monochrome methods and devices.

Although the various elements described in detail hereinafter have been correlated to an integrated system directed to the above-defined field of endeavor, it is to be understood that many of such elements are individually novel and of great utility in many arts and uses removed from the specific field of endeavor to which these elements have been applied by me as disclosed herein.

The electrical transmission of pictorial matter in monochrome (i. e., as a black and white reproduction) has been the subject of research by some investigators and has been performed, but the reproductions obtained are not clear and lack definition. The electrical transmission and reproduction of pictorial matter in natural colors has not been attained heretofore, but is readily and accurately accomplished by means of the present invention.

The methods and devices of the present invention may be used in the reproduction of colored facsimiles either from lithographs or colored transparencies or from original color separation negatives. It is to be understood that the apparatus is capable of reproducing colored prints either from negatives or from positives. In the event a color reproduction is to be made from three separate color separation negatives taken originally of the pictorial representation, such three color separation negatives may be simultaneously scanned, the photoelectric tube of each scanning system being associated with a logarithmic amplifier adapted to impart a linear response to the tube whereby the output voltage has a linear relation to the density of the film being scanned.

The present invention is particularly directed to the use of a multi-electrode type of photoelectric cell. Three separate color channels are obtained, each of these channels being provided with a logarithmic amplifier supplied with power from a suitable power supply which, in the preferred system, need not be constant, the preferred arrangement also including means for compensating for variations in intensity of the scanning light.

The output of each of the three logarithmic amplifiers may then be sent to a suitable transmitter (in the event the reproductions are to be made at a considerable distance from the place of origin) or they may be sent directly to a mixer. The mixer is provided with three color channel outputs and a gray or neutral output terminal, the present invention contemplating the reproduction in a plurality of separate colors together with automatic means for applying a gray or neutral ink or color in order to obtain the desired density in the reproduction. The gray or neutral ink and its correlated channel will hereafter be referred to as the gray channel output or ink.

The preferred type of mixer contemplated by this invention includes means for correcting the color voltages in accordance with the absorption characteristics of the colored inks being employed. It is well known that inks capable of absorbing but one color are not available so that an ink will absorb substantially all portions of the spectrum, the absorption characteristics, however, being of different magnitude in different portions of the spectrum. If, therefore, it is desired to use a red-absorbing ink, it will be found that such ink will also absorb portions of the red and blue regions of the spectrum. The mixer of the present invention compensates for the overlapping absorption characteristics of the inks being employed in the reproducing device. The output of the mixer not only controls the current output for each of the three color channels but in addition delivers a control gray output adapted to regulate the application of the gray or neutral ink during reproduction. In the preferred form of the present invention novel power supply means have been provided.

Each of the three color outputs as well as the gray output is then suitably amplified and supplied to a light weight coil movable within a constant magnetic field. These movable coils are designed to control the supply of colored inks and the gray ink to the recording device which, in general, consists of a means for rotating and axially moving a drum having a picture-receiving surface thereon. The size and rate of axial advance is correlated to the speed, size and rate of the original scanning device so that the reproductions are either of the same size or enlarged, as desired. These reproducing device means are provided for supplying the inks through minute nozzles directed into an air blast, the air blast being adapted to atomize the inks and carry them through a restricted opening in a shield, this shield being positioned between the nozzles and air blast directed thereagainst and the surface of the picture-receiving drum. Each of the nozzles is in communication with a source of suitable, preferably quick-drying ink of appropriate color. Each conduit communicating with a nozzle is provided with an enlarged chamber, one wall of which is in the form of a piston, the piston being actuated by one of the previously mentioned moving coils supplied with current from its corresponding color channel of the scanning and amplifying means.

In the preferred form of device, means are provided for automatically supplying each color conduit with fresh ink in timed relation with the movement of the reproducing drum, and a highly viscous fluid is employed within a portion of the conduit and in the enlarged chamber affected by the piston of the moving coil for imparting to the ink the desired rates of feed through the nozzles.

Many of the elements described hereinabove may also be employed in the production of either positive or negative engraved plates or rolls suitable for use in printing, lithographing or the like. The production of such engraved plates or rolls involves the use of moving coils provided with an engraving or scribing head instead of the piston heretofore described.

An object of the present invention, therefore, is to disclose and provide a novel form of scanning device and a logarithmic amplifier therefor whereby the output voltage bears a linear relation to the density of the pictorial representation being scanned.

Another object of the present invention is to disclose and provide means whereby automatic compensation may be attained for overlapping absorption characteristics of inks employed in making colored reproductions.

Another object is to disclose and provide a scanning means which employs an electron multiplier type of multiple electrode cell and includes an amplifier and control means whereby the output voltage of the scanning means is linear with respect to the density of the pictorial representation being scanned.

A still further object of the invention is to disclose improved methods and apparatus for the transmission and reproduction of pictorial representations in color and for the formation of engraved printing plates.

Moreover it is an object of the present invention to disclose and provide means whereby the output voltages of three separate color scanning channels are converted into three separate color channel outputs and a correlated gray output.

In general, it is an object of the present invention to disclose and provide an integrated method and apparatus for the successful transmission and reproduction of pictorial representations in various forms.

These and other objects, uses, modifications and adaptations of the present invention will become apparent to those skilled in the art from the following detailed description of certain exemplary forms of the present invention, it being understood that the invention is not limited to the specific arrangements hereinafter described and shown in the appended drawings since numerous variations and modifications may be made (as indicated in part hereinafter) without departing from the present invention.

In order to facilitate understanding, however, reference will be had to the appended drawings illustrative of certain arrangements, circuits, means and modes of operation embraced by this invention, and in such drawings.

Figure 1:
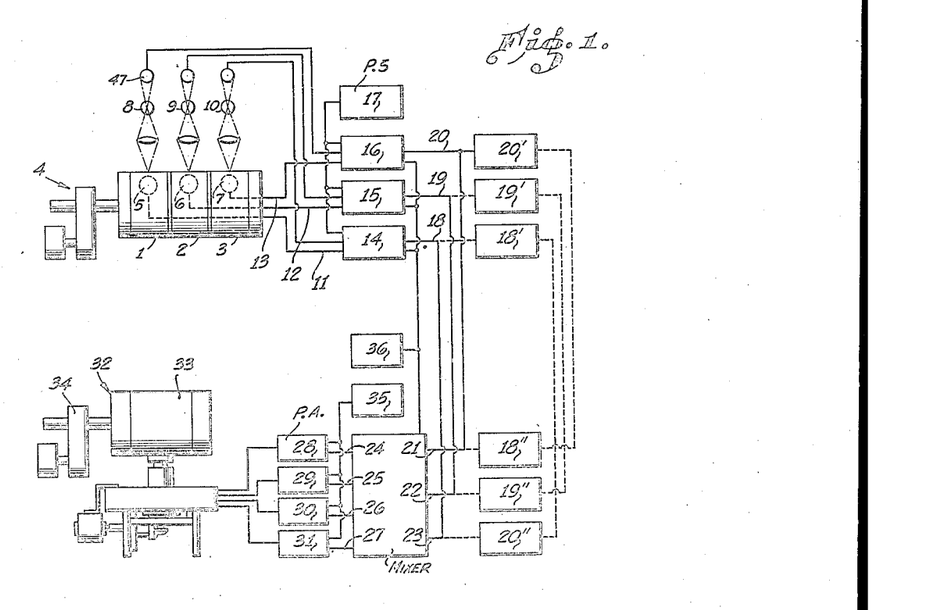
Fig. 1 is a diagrammatic representation of elements which may be employed in the reproduction of pictorial representations in color from three discrete color separation negatives.

A general arrangement of the various elements included in an integrated, complete system for the transmission and reproduction of pictorial representations in natural colors from three color separation negatives is diagrammatically illustrated in Fig. 1. As there shown, the scanning drum carrying three color separation negatives 1, 2 and 3 is rotated and axially moved by a suitable drive generally indicated at 4. Details of construction of the scanning drum and driving means need not be illustrated since such means are available and are known in the art.

Positioned within the scanning drum are photoelectric cells 5, 6 and 7 adapted to receive light from sources 8, 9 and 10 respectively. It is not necessary that the three sources 8, 9 and 10 be connected to a common power supply, since the preferred circuit hereinafter disclosed and embodied in the logarithmic amplifiers will compensate for variations of independent light sources in the event such variations occur.

The photoelectric cells 5, 6 and 7 are connected as by lines 11, 12 and 13 respectively with individual logarithmic amplifiers indicated generally at 14, 15 and 16. Lines 11, 12 and 13 constitute portions of three separate color channels to which reference will be made hereinafter.

Figure 2:
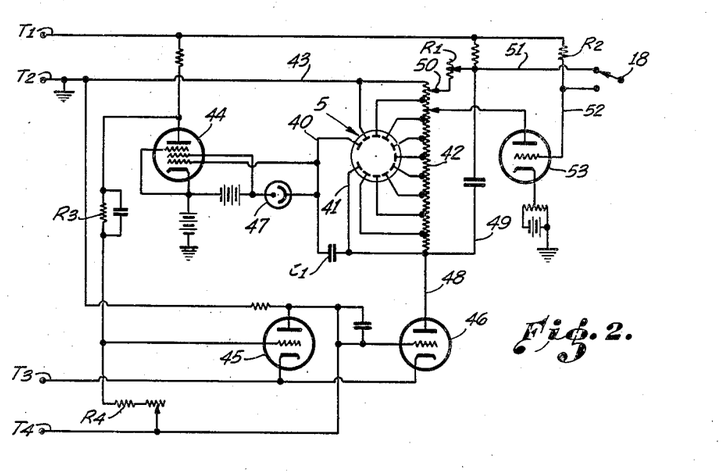
Fig. 2 is a diagram of a logarithmic amplifier employed in the scanning means.

The logarithmic amplifiers 14, 15 and 16 are preferably supplied with power from a power supply generally indicated at 17. Each logarithmic amplifier in connection with its associated scanning cell and control photoelectric cell constitutes a scanning means. The preferred form of scanning photoelectric cell is a multi-electrode multiplier tube. The details of the circuit will be described hereafter and are illustrated in Fig. 2. For the present it is sufficient to note that the scanning means are designed to compensate for variations in the intensity of light sources and to assure that the output from each scanning means is linear with respect to the density of the pictorial representation being scanned. The output terminals of the logarithmic amplifiers are indicated at 18, 19 and 20 respectively. These output terminals may be directly connected to the input terminals 21, 22 and 23 of a mixer. In the event it is desired to transmit the outputs so as to cause reproduction to take place at a distant point, the outputs 18, 19 and 20 of the logarithmic amplifiers may be connected to either one or a plurality of transmitters. It is to be understood that in the event a single transmitter is employed, separate channels or carrier waves are used for transmitting each of the color channels. In Fig. 1 separate transmitters are shown at 18', 19' and 20'. Separate receivers 18'', 19'' and 20'' are also shown, these receivers being then associated with the input terminals 21-23 of the mixer.

The mixer is provided with four output terminals 24, 25, 26 and 27. Terminals 24-26 may constitute the color output terminals, whereas 27 may be said to represent the gray output terminal of the mixer. As previously stated, the mixer includes means for correcting the color channel voltages in accordance with the overlapping of absorption characteristics of ink used in reproduction and also includes means for controlling the magnitude of the voltage in each channel. The mixer also involves means whereby the magnitude of the gray output is controlled in accordance with the density of the pictorial representation being scanned and reproduced. Details of the preferred form of mixer are diagrammatically illustrated in Fig. 4 and will be described hereafter.

The output from the terminals 24-27 inclusive of the mixer may then be sent through suitable power amplifiers 28, 29, 30 and 31 and then supplied to the reproducing device generally indicated at 32. Each color channel and the gray channel is connected to a separate moving coil of the reproducing device 32, these coils then controlling the supply of colored and gray inks to the color receiving surface of the reproducing drum 33, which is driven by a suitable driving means generally indicated at 34. Details of one form of reproducing device 32 are shown in Figs. 10 to 19 inclusive.

It may be noted that suitable sources of power are associated with the mixer and power amplifiers. Such power supply sources are indicated at 35 and 36.

The general arrangement diagrammatically illustrated in Fig. 1 will be described hereinafter in detail for the purpose of describing the construction of the various elements embraced in the system, the system being particularly adapted to the reproduction of prints in color from three separate negatives as illustrated. It is to be understood, however, that by minor changes and modifications which will be obvious to those skilled in the art from the subsequent detailed description, the system may be employed in the production of three or four separate engraved rolls or plates adapted for use in lithography or rotogravure work or may be employed in the reproduction of color prints from color transparencies or also may be employed in the production of either engraved plates or colored prints from original color prints. In the event a colored print is to be reproduced, then the scanning light will not pass directly through the negative or colored transparency mounted upon the scanning drum, but instead may be reflected therefrom. A part of the reflected light may be caused to pass through a prism (or beam splitter and color filters if desired) so as to separate the colored light into suitable bands of frequencies, each band then affecting a separate scanning cell. Or a portion of the reflected light from such colored print may be sent through a suitable filter to each of three separate scanning cells. Details of these modifications need not be disclosed, since they have been previously shown in general forms in certain prior patents, such as, for example, Patents No. 1,709,926 and No. 1,814,987.

*Scanning means and logarithmic amplifier*

A wiring diagram of the logarithmic amplifier is indicated in Fig. 2, wherein a multi-electrode scanning cell is indicated at 5, the light source not being shown in this diagram. The anode of the tube is connected to lead line 40 and the cathode is connected to lead line 41. The other electrodes, commonly called dinodes, are connected by suitable lead lines to a tapped resistance 42. Power input terminals are indicated at $T_1$, $T_2$, $T_3$ and $T_4$. $T_2$ is grounded and is connected to the last dinode of the multielectrode cell 5 as by line 43. A resistance coupled type of amplifier is shown embodied in this circuit, such amplifier including the vacuum tubes 44, 45 and 46. In the form of device shown, the amplifier tubes are resistance coupled in series, the first being a pentode and the latter two triodes. The cathodes of amplifier tubes 45 and 46 may be connected to $T_3$. A control photoelectric cell is indicated at 47, this cell receiving a portion of the light from the source 8, which is employed in scanning the pictorial representation 1, light through this representation falling upon the cell 5. The anode of the cell 5 is maintained as a positive potential by means of batteries and the current is modified by the control cell 47 under the influence of any variations in the intensity of the scanning light source which may occur. The control grid of tube 44 is connected to the anode of cell 5 and the cathode of the control cell 47.

The plate circuit of the tube 44 is resistance coupled to the amplifier tubes 45 and 46 as previously stated. The plate output of the last amplifier tube series is connected as by line 48 to the cathode 41 of the scanning cell and to the tapped resistance 42. It may also be connected as by line 49 through a counterbalancing condenser to the output terminal 18. The output voltage from the system is removed by an adjustable tap 50 which may be connected to the tapped resistance 42 at any suitable point, depending upon the working range of potential which is desired for use in the subsequent elements of the system. An adjusting variable resistance $R_1$ may be used for balancing purposes.

In a specific embodiment of the scanning means and logarithmic amplifier herein described, $T_1$ was at +250 volts, $T_3$ at —1800 volts and $T_4$ at —2000 volts. Under these conditions, if the anode current of the cell 5 is greater than that of the control cell 47, the grid of the amplifier tube 44 will be made more negative than its final equilibrium value. This will in turn cause the plate of the final amplifier tube 46 to become more positive. The voltage across cell 5 is decreased and its amplification constant is decreased, thereby decreasing the anode current of the cell 5. In the event the inherent capacity of the cell 5 is low, oscillation would take place with oscillations of large amplitude and comparatively low frequency. Such oscillations may be prevented by the use of a condenser $C_1$ adapted to apply a current to the anode 40 of the cell 5 and the cathode of cell 47, the magnitude of which is proportional to the rate of change of voltage across the cell 5. Such condenser would not be necessary in the event the cell 5 has a sufficiently high inherent capacity. Any oscillation of small amplitude and high frequency, say about 15,000 or 20,000 C. P. S. would not be detrimental to the successful operation of the device.

It is to be noted that means have been provided which are responsive to the variations of current output of the anode 40 for adjusting the voltage across the dinodes of the cell 5 so as to maintain the current output of the cell 5 substantially equal to that of the control cell 47, such means including the control cell 47 and the vacuum tube amplifier associated therewith. In this manner, the output voltage across the dinodes is virtually linear with respect to the density of the pictorial representation being scanned. It is also to be noted that the output terminal 18 may be connected either to line 51 or to line 52. When the terminal 18 is connected to line 51, the change in potential at the terminal 18 is of the same sign as the change in potential of the cathode 41. If the terminal 18 is connected to line 52 and thus to the tube 53, then the change of potential at the terminal 18 is of opposite sign to the change in potential in the cathode 41. It is to be noted that the input to tube 53 is applied to the plate and the output is taken from the grid, the grid drawing a current determined by the resistance $R_2$. By selectively connecting terminal 18 either to line 51 or line 52 the system may be rendered operative to make positives from either negatives or positives.

Figure 3:
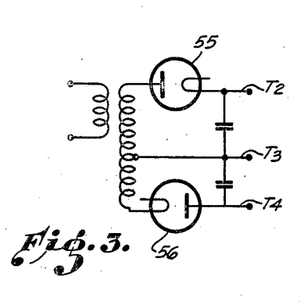
Fig. 3 illustrates a form of power supply adapted for use with the amplifier.

In order to render the grid to filament voltage to tube 45 nearly independent of the power supply voltage, the voltage change across the resistance $R_3$ due to fluctuations in line voltage, is made proportional to the changes across the resistance $R_4$ due to fluctuations in line voltage. This is accomplished by causing the voltage between the terminals $T_2$ and $T_3$ to be proportional to the voltage between $T_3$ and $T_4$. A power supply adapted to attain this result is indicated in Fig. 3, the output terminals of the power supply being indicated at $T_2$, $T_3$ and $T_4$. This power supply includes two half wave rectifiers 55 and 56 attached to each terminal of the secondary, such secondary being tapped as indicated, thereby permitting the output voltages to be maintained proportional with variations in voltage across the primary. The voltage between $T_3$ and $T_4$ is therefore a predetermined proportion of the voltage between $T_2$ and $T_3$.

*Mixer*

The various output terminals, such as the terminals 18, 19 and 20 from the logarithmic amplifiers, may be connected directly to the input terminals 21, 22 and 23 respectively of the mixer. As previously stated, it may be desired to use transmitting and receiving tubes, in which event the three receiving channels are connected to the input terminals 21–23 of the mixer. The mixer in general is primarily designed to produce a gray or neutral component so that the gray or neutral density of a colored reproduction may be attained by means of a gray ink instead of depending upon a mixture of the colored inks for attainment of the desired density. Moreover, the mixer is adapted to compensate for the overlapping absorption characteristics of the various colored inks so that overemphasis of a given color in the reproduction is virtually eliminated.

Figure 4:
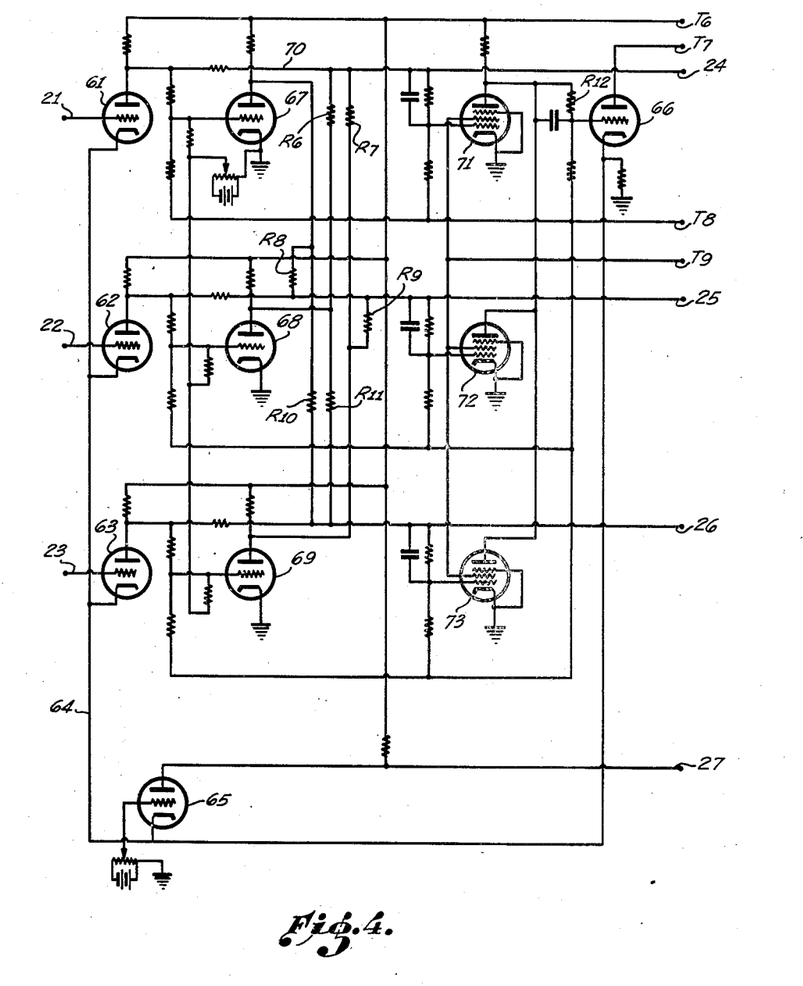
Fig. 4 is a wiring diagram of the mixer.

By referring to Fig. 4, input terminals are shown at 21, 22 and 23 whereas the output terminals are indicated at 24, 25, 26 and 27, the last being the gray density output. A so-called primary tube is connected to each of the input terminals 21, 22 and 23, these primary tubes being indicated at 61, 62 and 63. The cathodes of these tubes are connected by means of a line 64 with the cathode of an amplifier tube 65 and a regulator tube 66. Each of the primary tubes 61, 62 and 63 is resistance coupled to a correlated reversing tube, these reversing tubes being indicated at 67, 68 and 69. The primary function of these reversing tubes is to reverse the sign of voltage changes so as to permit the hereinafter described subtracting or correcting functions of the circuit to be carried out, thereby correcting for the overlapping characteristics of the inks controlled by the outputs from terminals 24, 25 and 26.

The output terminals 24, 25 and 26 are connected to the plate circuits of the primary tubes 61, 62 and 63, and at the same time each output terminal is connected by bleeder circuits to the reversing tubes of the other primary tubes. For example, output terminal 24 is connected as by line 70 to the plate of primary tube 61 and is also connected through resistance $R_6$ to the plate of reversing tube 68 (correlated with primary tube 62) and through resistance $R_7$ with the plate of reversing tube 69 (correlated with primary tube 63). Output terminal 25 is connected to the plate of primary tube 62 and is also connected through resistance $R_8$ and resistance $R_9$ to the plates of reversing tubes 67 and 69. The circuits, including the resistances $R_6$—$R_{11}$ interconnecting each output terminal with the reversing tubes of other color channels, are herein termed "bleeder circuits" and the values of the resistances $R_6$—$R_{11}$ are relatively high in comparison with the resistance of the direct connection between the output terminal and the plate of its corresponding primary tube. The values of the resistances $R_6$—$R_{11}$ are selected and adjusted in accordance with the overlapping of the absorption characteristics of the various inks used in the reproducing device, the flow of which inks is controlled by the outputs from terminals 24–26.

Each of the primary tubes is resistance coupled to a separate color regulator tube. These color regulator tubes, in connection with a gray regulator tube, constitute means for controlling the magnitude of each color output voltage in accordance with the difference between the color input voltages supplied at terminals 21, 22 and 23. The three color regulator tubes are indicated at 71, 72 and 73 and it is to be understood that although pentode-type tubes are specifically shown, other types may be employed as well. These three color control tubes 71–73 are interconnected by common screen grid and plate circuits, the plate circuit of these tubes being resistance coupled, as indicated by resistance $R_{12}$, with the grid of the regulator 66.

Although the range in potential at the gray terminal 27 normally falls within established limits, the values may be adjusted by varying the biasing voltage on the grid of tube 65. $T_6$, $T_7$, $T_8$, and $T_9$ indicate terminals to which a suitable power supply may be attached, $T_9$ in one exemplary form of the invention being attached to a small 9-volt C battery. In view of the fact that the terminal $T_7$ needs be supplied with considerable current in comparison with the supply to terminals $T_6$ and $T_8$, it is desirable to employ a separate power supply connected to $T_7$.

Figure 5:
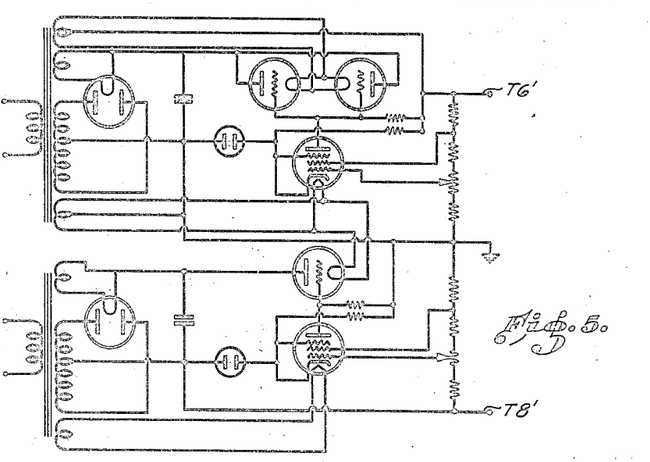
Fig. 5 illustrates in diagrammatic form a form of power supply suitable for use with the mixer of Fig. 4.

An exemplary form of power supply adapted for use with the mixer is shown in Fig. 5, its output terminals being identified as $T_6'$ and $T_8'$, $T_6'$ being adapted to furnish +250 volts whereas $T_8'$ is −250 volts.

Figure 8:
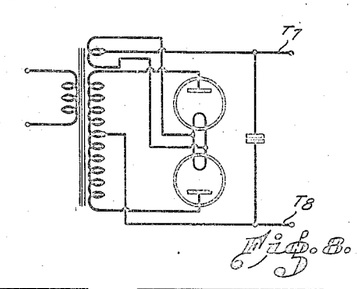
Fig. 8 illustrates a power supply adapted for use in connection with the power amplifiers.
Figure 9:
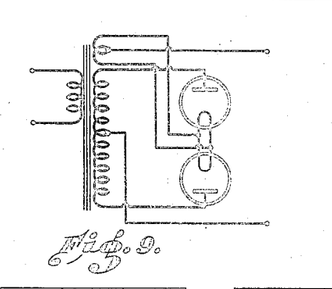
Fig. 9 illustrates a modified form of power supply particularly adapted for supplying current to the field coil of the reproducing device.
Figure 10:
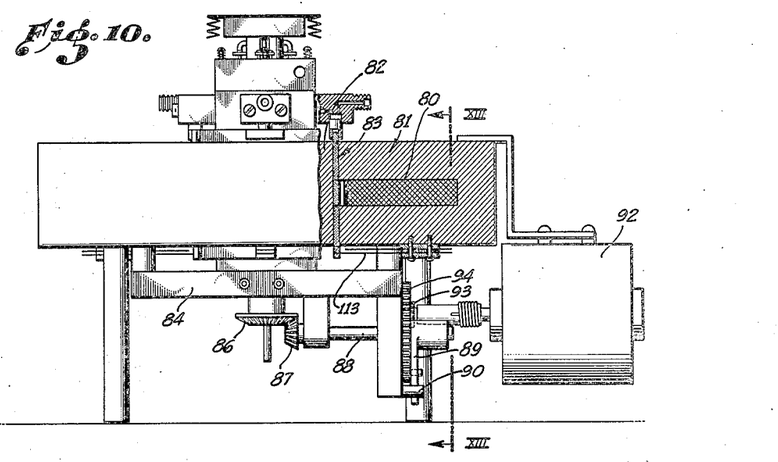
Fig. 10 is a side elevation, partly broken away, of one form of reproducing head.
Figure 11:
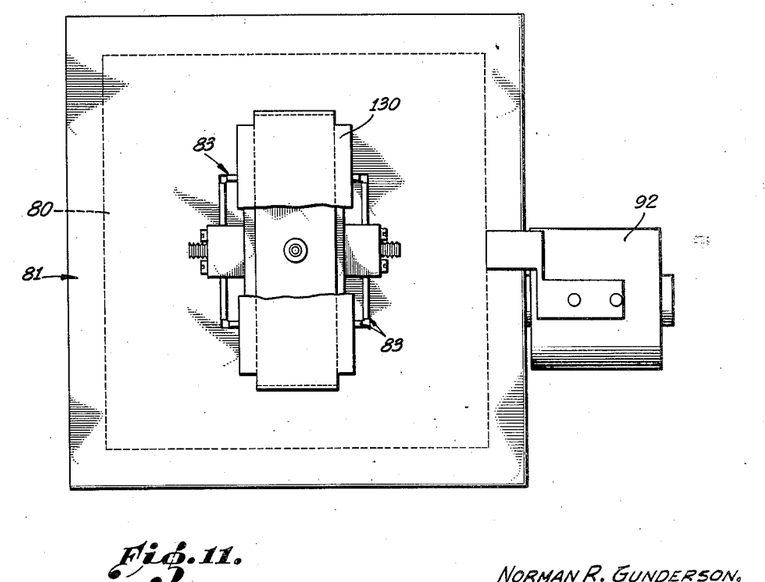
Fig. 11 is a plan view thereof.
Figure 12:
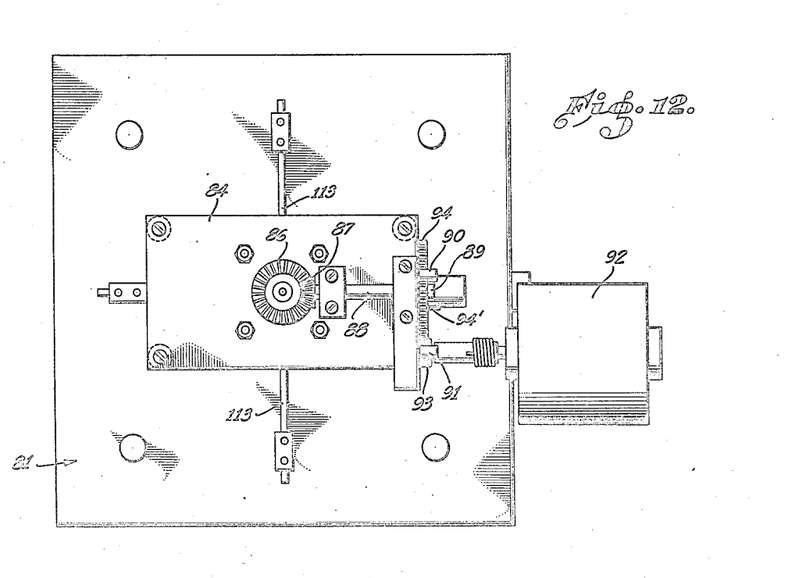
Fig. 12 is a bottom view of the reproducing head.

The power supply shown in Fig. 5 is characterized by the use of vacuum tubes in series with the power terminal $T_6'$, the voltage on the grids being regulated by an amplifier tube supplied with constant potential from a suitable source such as a battery or the neon tube indicated. Any constant potential power supply may be employed. In the form of mixer shown in Fig. 4, when $T_6$ and $T_8$ are connected with sources of +250 and −250 volts, $T_7$ may well operate at +180 volts and such terminal $T_7$ may be connected to a power supply of the character indicated in Fig. 8 which may also be used in connection with the power amplifiers referred to hereinafter.

The operation of the bleeder circuits hereinbefore referred to may perhaps be best understood by first considering that a gray or neutral area on the reproducing surface may be obtained by applying three inks, one capable of absorbing the short wave lengths, another able to absorb the long wave lengths of visible light and the third capable of absorbing in greatest quantity the intermediate wave lengths. These three inks, if uniformly applied, would result in a dark spot or area, eliminating from consideration for the present the introduction of any black or gray truly neutral ink.

Figure 22:
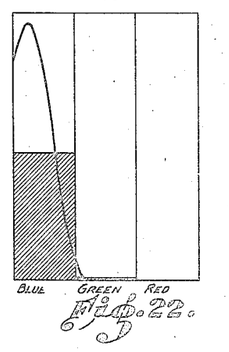
Figs. 22, 23 and 24 are diagrammatic representations of the absorption characteristics of three inks which may be used in the reproducing system.
Figure 23:
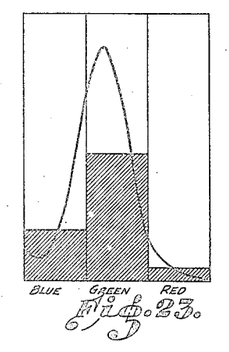
Figure 24:
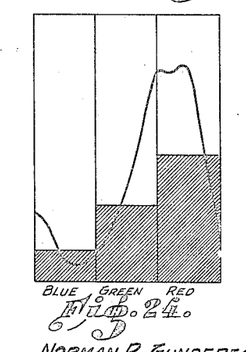

Approximate absorption characteristics of three typical inks are shown in Figs. 30, 31 and 32, wherein Fig. 30 approximates the absorption characteristics of a so-called blue-absorbing ink, Fig. 31 represents the absorption characteristics of a so-called green-absorbing ink and Fig. 32 indicates the general characteristics of a red-absorbing ink. Actually by transmitted light the three inks may be termed red-orange, mauve and blue-green, although it is to be understood that these figures and names of the colored inks are arbitrary and illustrative only. In the event it is desired to convert the original hypothetical dark spot into a green-colored spot, then the quantity of so-called green-absorbing ink being supplied may be reduced or even completely eliminated so that only the blue-absorbing and red-absorbing inks are being supplied, the area of the reproducing surface thus being capable of reflecting that band of frequencies which create or give rise to a green color impression. If it is desired to simply impart a green tone or color to an area, the amount of green-absorbing ink being supplied to the reproducing head will be reduced but it is to be noted that the absorption characteristics of the green-absorbing ink extend into the adjacent bands of frequencies (generally called blue and red) and therefore the quantity of blue-absorbing and red-absorbing ink being supplied to the reproducing head should be increased. In the example given in Fig. 31, the average density in the so-called blue band is three times the average density of the green-absorbing ink in the so-called red band of the spectrum. For this reason, the amount of blue-absorbing ink should be increased to a greater extent than the increase in the amount of red-absorbing ink supplied to the reproducing head, the relative increases in the amounts of blue and red-absorbing inks depending upon the absorption characteristics of the green-absorbing ink in the so-called blue and red ranges of the spectrum. The values of the various resistances $R_6$ to $R_{12}$ in the bleeder circuits are determined by the overlapping absorption characteristics of the three inks actually employed in the reproducing head. In computing the values of the various resistances, consideration must also be given to the absorption characteristics of each ink in each of the three main divisions of the spectrum. In actual practice, the control of the final density of the reproduced picture is allocated in large part to the gray ink channel, the magnitude of the gray color voltage being primarily dependent upon the magnitude of the least of the three color inputs at terminals 21, 22 and 23.

It is to be understood that the three color input channels 21–23 operate within a given voltage range. The circuit is set for zero level response or zero ink flow on that portion of a negative or positive for which no ink supply is desired, and after other adjustments have been made, the least affected of the color regulator tubes 71–73 controls the gray regulator tube 66. If, therefore, the transparencies or negatives being reproduced represent a white spot, no ink-supplying output is delivered from the terminals 24 to 26 nor is any gray ink-producing output delivered from the terminal 27. If, however, the spot being scanned represents a gray density and the three input voltages at terminals 21, 22 and 23 are equal, then the output potentials of terminals 24 to 26 will not change because the regulator tube 66 will change the potential of the cathodes in tubes 21, 22 and 23 by the same amount that the grid potentials thereof have been changed. At the same time, tube 66 would have changed the potential of the cathode in amplifier 65 so as to control the output at terminal 27 to supply the required amount of gray ink. In the event the response from the scanning means is unequal, then the least affected of the color regulator tubes 71 to 73 controls the gray regulator 66, the circuit being selective so that only the least responsive of the tubes 71-73 affects tube 66. Tube 66 not only adjusts the cathode voltage of that color channel which was least affected (to reduce the output of such channel at its corresponding output terminal to zero level) but also increases the output of the amplifier 65 by an amount proportional to the input into such least affected of the three color channels, thereby permitting the gray or neutral ink to effectively control the density of the reproduction being made.

The circuit here shown first subtracts a gray voltage from the three color voltages, then applies a color correction, then selects the least of the three color voltages and finally regulates the gray voltage. These steps need not be carried out in this sequence, since the selection of the least of the three color voltages may be accomplished first, followed by regulation of the gray voltage, subtraction of gray from the three color voltages and color correction. The color correction step could be eliminated. The preferred and first mentioned sequence appears to give much better results, however.

*Power amplifiers*

Figure 6:
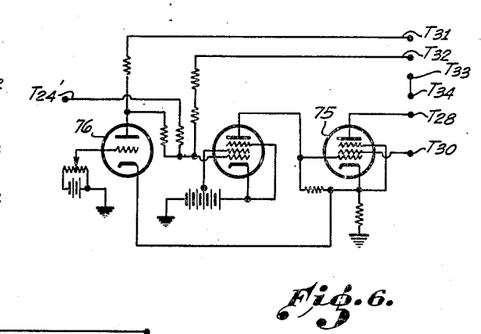
Fig. 6 illustrates a power amplifier adapted for use in a color channel.
Figure 7:
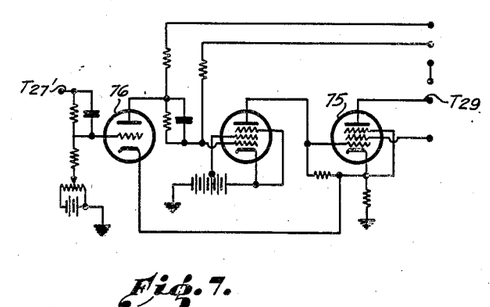
Fig. 7 illustrates a power amplifier adapted for use in the gray channel.

The outputs from the mixer are sent to separate power amplifiers 28-31. A power amplifier for a color channel is indicated in Fig. 6 and a power amplifier adapted for use with the neutral channel is indicated in Fig. 7. The output terminal 24 of the mixer may therefore be connected to terminal $T_{24'}$ of Fig. 6 whereas the output 27 may be connected to the terminal $T_{27'}$ shown in Fig. 7. Each power amplifier is provided with an output terminal, such as $T_{28}$ shown in Fig. 6 leading to a moving coil of the reproducing device, the output channel of the amplifier shown in Fig. 7 being indicated at $T_{29}$. Each of the power amplifiers diagrammatically illustrated in Figs. 6 and 7 consists of three tubes resistance coupled in series. The last tube, indicated at 75, is a power tube. An inverse feed-back is provided from such tube to the first of the series, such as tube 76, by means of a common cathode line which is grounded through a biasing resistance. The effect of the inverse feed-back is to make the output current to the coil at $T_{28}$ more independent of the plate voltage of the output tube and to make the output current more linear with respect to the input voltage.

In a typical installation, the following values were used: at $T_{30}$, +180 volts; at $T_{31}$, +250 volts; at $T_{32}$, -250 volts; at $T_{33}$, +400 volts, this last terminal being connected at $T_{34}$ to the other end of the moving coil connected to $T_{28}$. Similar values may be used in the amplifier for the gray channel.

Attention may be called to the fact that in the amplifier illustrated in Fig. 7 the input from terminal 26 is connected at $T_{27'}$ to the grid of the first tube of the amplifier through appropriate voltage dividing resistances. A potentiometer and battery are also provided in order to regulate the grid potential of the first tube for adjustment purposes. In the color channel amplifier shown in Fig. 6 the output of the mixer is connected to the grid of the second tube through an appropriate resistance.

*Reproducing head*

The reproducing head generally indicated at 32 in Fig. 1 consists of a suitably driven rotatable and axially movable drum which need not be described in detail. By referring to Figs. 10 to 19, one form of reproducing head is there shown. As there shown, the body of the reproducing device consists of a hollow, substantially square field coil 80 within the magnetic frame 81. Positioned in the center of this hollow square is a solid magnetic core 82, sufficiently spaced from the inner surfaces of the hollow square so as to permit a readily movable fit to four movable coils, one of the coils being indicated at 83. This structure is supported upon suitable legs, the center armature 82 being supported by the framework 84. Extending vertically through the center of the armature 82 is a hollow rotatable drive shaft 85 provided with a mitre gear 86 at its lower end. This shaft is periodically partially rotated, the partial rotation of this shaft being in timed relation to the rotation of the reproducing drum.

Figure 13:
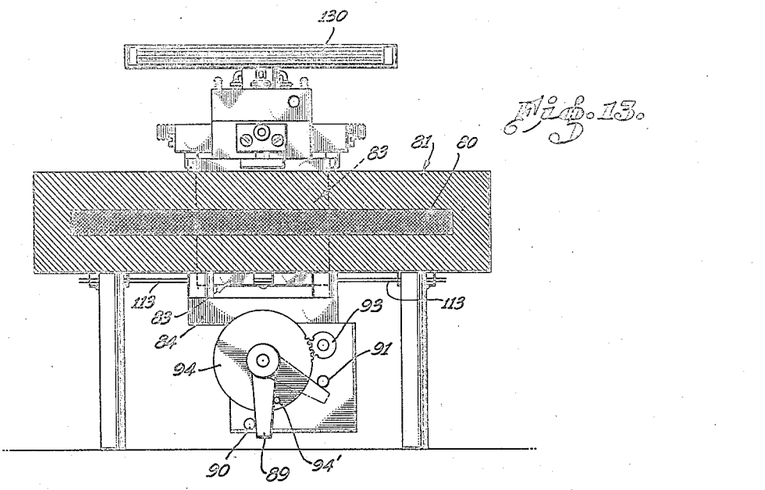
Fig. 13 is a section taken along the plane XIII—XIII of Fig. 10.

The mitre gear 86 is shown in engagement with another mitre gear 87 carried by intermittently driven shaft 88 suitably journaled in brackets, the shaft 88 also carrying a stop arm 89 adapted to move against stop pins 90 and 91, as best shown in Fig. 13. The reversible motor 92 drives a gear 93 at suitably timed intervals, the gear 93 being flexibly coupled to the motor 92 and in engagement with a gear 94 which is journaled on shaft 88 and is provided with a pin 94' capable of striking the arm 89 to rapidly move it from the position indicated in full lines in Fig. 13 to that shown in dotted lines and vice versa, in timed relation to the reproducing drum. The motor 92 may be interlocked or controlled by the motor drive to the reproducing drum.

Figures 14, 15, 20, 21:
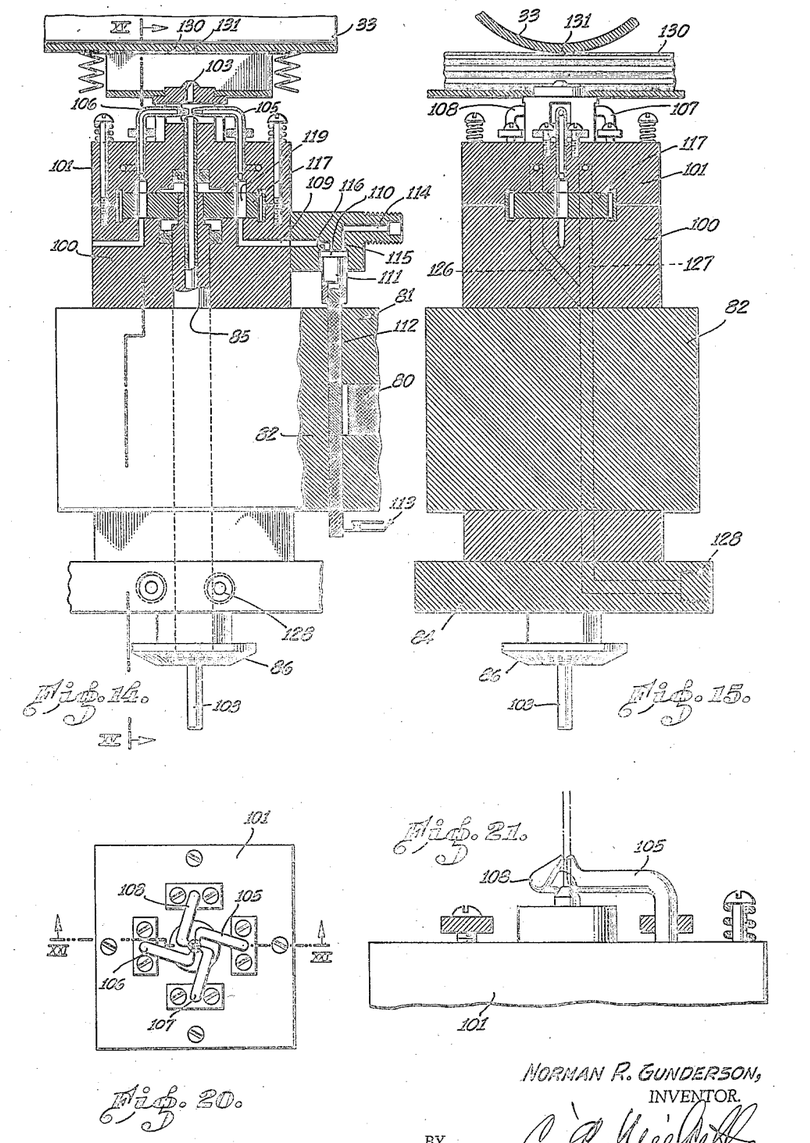
Fig. 14 is an enlarged view through a portion of the reproducing head.
Fig. 15 is a vertical section taken along the plane XV—XV of Fig. 14.
Fig. 20 is a plan view of a modified arrangement of nozzles for use in the reproducing head.
Fig. 21 is a vertical section thereof taken along the plane XXI—XXI of Fig. 20.
Figure 16:
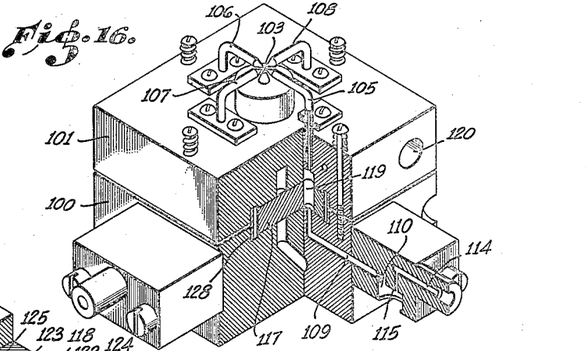
Fig. 16 is an isometric perspective of the head with a portion thereof cut out.

As shown in Figs. 14 to 21 inclusive, the armature 82 is provided with an upward extension or head which may be made of a lower block 100 and an upper block 101 suitably attached thereto, the blocks being preferably of non-magnetic material. Extending through these blocks centrally through the center of the intermittently rotated shaft 85 is an air conduit 103 connected to a source of air at a sufficiently high pressure to atomize ink supplied to such air stream through a plurality of nozzles 105, 106, 107 and 108 carried by the upper block 101. The tops of these nozzles are provided with minute perforations or openings (on the order of 0.004 of an inch). The ends of these nozzles are preferably placed in alignment with the inner surfaces of the air conduit 103 so as to assure substantially complete removal of all ink ejected by the nozzles without creating undesirable suction effect on the ink within the nozzles. Although the nozzles shown in Figs. 14 and 15 are pointed transversely to the air stream, other arrangements may be used, such as for example, that shown in Figs. 20 and 21 wherein the nozzles are upwardly extended into the air stream emitted by conduit 103.

In the drawings a reproducing head having four nozzles is shown, three of these nozzles being adapted to supply colored inks, the fourth nozzle being associated with a source of gray ink. In accordance with the present invention, the rate of feed of the inks through the nozzles is controlled in accordance with the variations in the electrical energy from the scanning means, mixer and amplifiers hereinbefore described. By varying the pressure on bodies of ink to which the nozzles are connected, the nozzle 105, for example, may be in communication with a conduit 109 leading to an enlarged chamber 110, the open side of such chamber being closed by a movable piston 111 carried by a movable coil 112. The coil itself is positioned within the magnetic field between the armature 82 and the magnetic frame 81. Each of these moving coils such as 112, is made so as to slidably fit within the gap between one side of the armature and the corresponding side of the magnetic frame and is supplied with current from a color channel or gray channel, depending upon the color of the ink being supplied to the air stream by the nozzle.

Figure 19:
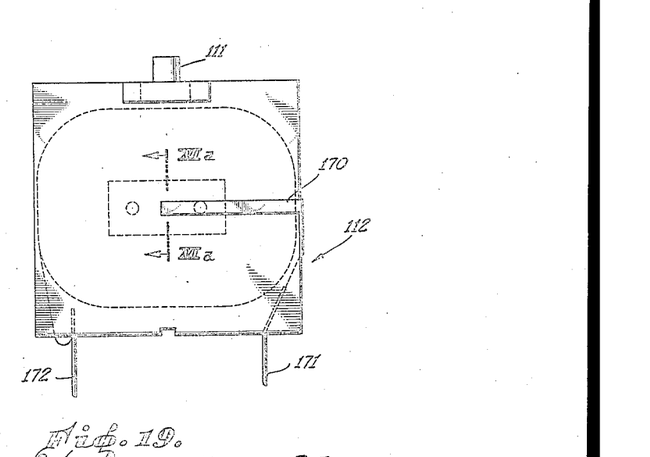
Fig. 19 is a side elevation of one of the moving coils used in the reproducing head.
Figure 19A:
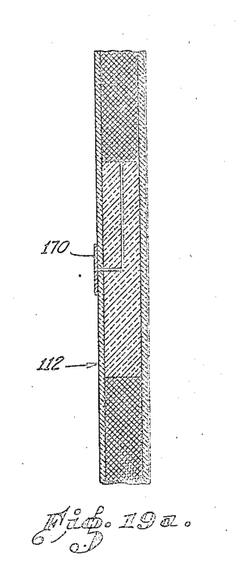
Fig. 19a is an enlarged transverse section of the coil shown in Fig. 19.

Figs. 19 and 19a illustrate one form of coil which may be employed. As there shown, the coil is preferably of the thin, pancake type, the wire being wound on a suitable insulation core, the entire winding being then impregnated with a suitable self-hardening thermoplastic or thermosetting insulating composition such as Bakelite. The inner terminal of the coil may be connected to a thin metal strip 170 which extends along the surface of the coil to one edge and is there connected to a flexible lead 171. The other flexible lead to the coil is indicated at 172. The piston 111 is preferably of non-magnetic material. Each coil is preferably yieldingly supported as upon one arm of a make and break switch, indicated at 113, such switch being connected to a pump when desired, as described hereinafter. It will be evident that in the event the moving coil 112 is connected to its correlated power amplifier and color channel and in the event the conduit 109 and chamber 110 are filled with ink, movements of the coil 112 and the piston 111 carried thereby will result in the imposition of a varying pressure upon the ink in the chamber and conduit, thereby controlling the discharge of ink through the nozzle 105. As the amount of ink in the conduit 109 and chamber 110 is depleted, the piston 111 will move upwardly under the yielding influence of the contact switch 113. In order to minimize the inertia of fluid moving through conduit 109 and permit more rapid changes in the magnitude of flow to take place, a capillary 116 may be placed between the chamber 110 and the conduit 109. Moreover, under these conditions it would be highly desirable to employ as viscous ink as possible in order to assure a more rapid cutoff when it is desired to terminate the discharge of ink. When, due to depletion of ink from chamber 110, the piston 111 has moved upwardly sufficiently to close switch 113, a pump (not shown) is energized by closure of such switch, the pump forcing new ink into chamber 110 through conduit 114 and capillary 115.

In actual practice, however, it has been found desirable to employ a pressure applying fluid to a body of ink, such body of ink being then connected to a nozzle. In the drawings, the chamber 110 is shown connected to a conduit 114 through a capillary 115. The conduit 114 is connected to a source of fluid or to a pump adapted to supply fluid under pressure to the chamber 110. The fluid so supplied is preferably very viscous and immiscible with the inks being employed. Fluids having viscosity of about 600 poises, such as viscous hydrocarbon oils have been found suitable. In the event conduit 114 is connected to a pump, such pump is controlled by the switch 113. The capillary 115 is for the purpose of inhibiting or reducing return or backflow from the chamber 110 into the conduit 114. When the arrangement just described is employed, the piston 111 acts against the viscous liquid in the chamber 110, such viscous liquid extending into the lower portion of the conduit 109.

Figure 18:
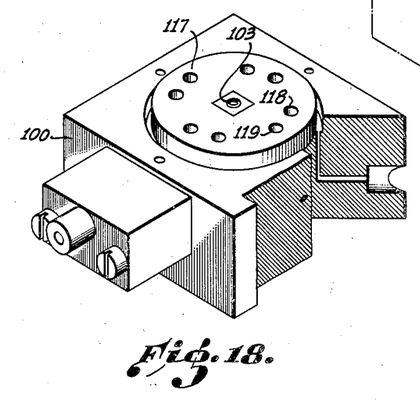
Fig. 18 is a perspective view of the lower portion of the reproducing head with a section cut away.

Means for supplying ink to this conduit and to the nozzle 105 are provided and such means may comprise a rotatable member 117 mounted upon the end of the rotatable shaft 85, the member 117 being provided with chambers or bores such as the bores 118 and 119, best shown in Fig. 18, Fig. 14 showing the bore or reservoir 119 in alignment and in communication with the conduit 109 and nozzle 105. Variations in pressure in chamber 110 (produced by minute movements of the piston 111) are thereby transmitted by the heavy viscous fluid to the ink in the reservoir 119 and cause regulated discharge of ink through the nozzle 105. It is understood that the presence of the capillary 116 will absorb most of the pressure generated by piston 111 in the chamber 110, so that the variations in pressure between the capillary 116 and the nozzle 105 are of a very low order in comparison with the pressures in the chamber. More rapid changes in flow through the nozzle are thus attained without the inertia effects which would normally be expected. Since most inks are somewhat compressible, it is desirable to make the reservoir 119 relatively small and to supply fresh bodies of ink in timed relation with the rotation of the reproducing drum 33. This is accomplished by periodically and alternately introducing the bores 118 and 119 in alignment with the nozzle 105, one of the bores supplying ink to the nozzle while the other is being flushed and recharged.

Figure 17:
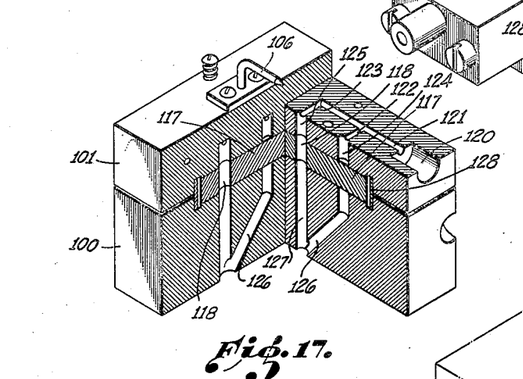
Fig. 17 is another isometric view of the head with portions cut out along vertical and horizontal planes.
Figure 17A:
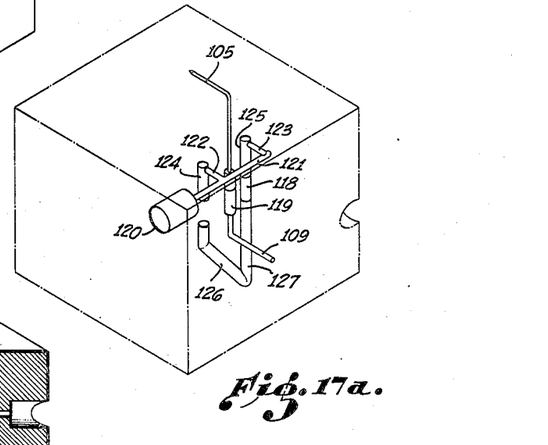
Fig. 17a is a perspective, diagrammatic representation of the conduits associated with a single nozzle of the reproducing head.

In Figs. 14, 15, 16, 17a and 18 the reservoir 119 is shown in alignment with the oil conduit 109 and the ink nozzle 105. The reservoir 118 is in an inoperative position with respect to the nozzle but it is in a recharging position and flushing position with respect to an ink supply which is being passed through the reservoir 118 and discharged therefrom. One such ink supply line in its relationship to reservoirs 118 and 119 is shown in Fig. 17a. It will be noted that the upper block 101 is provided with a port 120 adapted to be connected to a source of ink or an ink pump, such port 120 communicating with conduit 121 having branches 122 and 123 and vertical ducts 124 and 125 whose open ends abut the upper surface of the rotatable member 117. In the position shown in Fig. 17a, port 120 is in communication with reservoir 118 of the rotatable member 117 by conduits 121, 123 and 125. The lower block 100 of the reproducing head is provided with conduits or discharge tubes 126 and 127 which join and extend downwardly through the armature 82 and communicate with discharge ports such as the port 128 formed in the supporting bracket of the device.

Discharge port 128 is in communication with an ink storage reservoir. The ink is pumped from this reservoir through a plug of cotton or glass wool in order to remove any drops of oil which may be present and is then passed through a chamber for the separation of any possible air bubbles. The ink then flows into port 120, out of port 128 and back into the storage reservoir. Oil which has been flushed from the ink reservoirs 118 and 119 accumulates in the storage reservoir either above or below the ink according to its density. Periodically the oil is drained from the storage reservoir and the ink is replenished. The ink pump may be a small diaphragm pump such as an automobile gasoline pump.

The circular element 117 is partially rotated in timed relation to the means for driving the reproducing drum so as to periodically introduce a bore filled with fresh ink into the ink conduit leading to a nozzle. In Fig. 17a the bore 118 is shown being flushed whereas bore 119 has been introduced into the ink conduit. When the circular member 117 is partially rotated it will be rotated so as to move the bore 119 in alignment with the flushing bore 124, the refilled and recharged bore 118 being then placed in alignment with the ink conduit 109. Preferably the bores 118 and 119 are spaced a distance equal to their diameter along the arc of their movement so that the change from bore 118 to 119 and vice versa is almost instantaneous.

It is to be understood that although the conduits associated with nozzle 105 have been described in detail, similar arrangements of conduits, forks and channels are associated with each of the other nozzles.

Fig. 18 discloses means for supplying a lubricating oil to the periphery of the intermittently, partly rotated circular member 117, a suitable sealing ring 128 being positioned around the member to prevent oil leakage between the blocks 100 and 101. Also, in order to provide for the flow of this lubricating oil a hole is provided in member 117 from its outside edge or periphery to its centrally located square hole. The pressure of the oil in the sealed chamber thus formed is maintained at a value greater than the maximum pressure in any of the ink reservoirs. By this means the inks are prevented from leaking out along the sliding surfaces of member 117. Instead, the lubricating oil leaks into the reservoirs along the sliding surfaces, but due to the high viscosity of the oil the leakage is negligible.

In general, therefore, each of the moving coils, such as the coil 112, is connected to its separate power amplifier and color channel and controls the supply of ink to a nozzle. Mounted above the nozzles is a shield 130 having a minute opening or perforation 131 therein, said perforation being in axial alignment with the air conduit 103. The reproducing drum may either be in contact with the shield 130 or slightly spaced therefrom. Ink supplied to the upwardly directed air stream is virtually atomized and blown against the shield 130, a desired proportion of ink passing through the aperture 131 and forming the desired spot or line of suitable color on the paper carried by the reproducing drum 33. Mixing of different colored inks takes place in the air stream and the distance between the tips of the nozzles and the shield 130 should be sufficient to permit mixing of the inks before they pass through the aperture 131. In order to give the finest possible spray the inks may be liquids of low viscosity and low surface tension such as solutions of dyes in methyl alcohol.

As previously stated, instead of producing colored prints or reproductions, engraved rolls or dies may be obtained, these engraved rolls or plates being then adapted for use in printing or lithographing reproductions in color. In this modification each of the color channels is attached to a separate engraving head, and although four separate plates can thus be obtained simultaneously, it is desirable to have the various plates scanned and cut or engraved along scanning lines which cross or intersect so as to eliminate the possibility of producing a moire effect in a print made from plates obtained by having the negative or various negatives scanned in the same direction. The various power amplifiers 28–31 may therefore be connected to separate engraving heads but only two of these actually operated while the color separation negatives 1, 2, and 3 are being simultaneously scanned, thereby obtaining two plates representative of two colors. The negatives 1, 2 and 3 can then be placed around the scanning drum at a different angle (with respect to the axis of the scanning drum) and again simultaneously scanned, the two remaining engraving heads being operated during this second scanning operation. The result of this procedure would be to obtain four engraving plates or rolls, two of them being obtained by scanning in one direction and two in a different direction, thereby assuring more pleasant and accurate reproduction when the plates are consecutively used in a lithographing process, or only one engraved roll can be obtained at a time, the scanning angle being changed for each roll produced.

Instead of the power amplifiers heretofore described and illustrated in Figs. 6 and 7, the output terminals 24, 25, 26 and 27 of the mixer are preferably connected to power amplifiers adapted to cause positive movement of the engraving tool carried by a moving coil both into and out of cutting or engraving position, such amplifiers including resistance coupled push-pull tubes responsive either to high frequencies or direct currents, thereby permitting the cutting tool to maintain a steady position under appropriate conditions. Moreover, the amplifiers particularly adapted for use with the engraved heads should be provided with photoelectric means adapted to automatically control the depth of cut so that eccentricities of the roll upon which engraving is made or the presence of softer or harder portions or areas in such roll is automatically overcome, and for a given color channel potential a uniform cut is made, irrespective of these variations. A form of engraving head and amplifiers particularly adapted for use therewith are specifically described in divisional patent applications.

*General operation*

In order to clarify the general assembly described hereinabove, the correlated operation of the device illustrated in the drawings and described hereinbefore will now be given. In the specific embodiment hereinbefore referred to, the multi-electrode cell 5 has its last diode grounded and its anode maintained normally at a positive potential of say 40 to 45 volts with respect to ground. The cathode voltage of the tube 5 may be varied between about 0 and −1500 volts (when an extreme range in density variation is to be reproduced) but ordinarily an operative range of from about −500 to −1000 volts is sufficient. The potential across the cell 47 is normally maintained at say 45 to 50 volts by a suitable battery. The tube 44 is coupled to tube 45 and tube 45 to tube 46, as shown. A very small grid voltage change for the tube 44 will cause the plate voltage of tube 46 to change by as much as 1500 volts.

As previously pointed out, in the event the inherent capacity of the cell 5 is low, oscillation would take place but such oscillations may be prevented or inhibited by the use of a condenser $C_1$ adapted to apply a current to the anode 40 of the cell 5 and the cathode of cell 47. The magnitude of change is proportional to the rate of voltage change across the cell 5. This current is of such sign that it tends to decrease the rate of change of voltage across the tube 5 and therefore tends to damp out changes in voltage across this tube.

When the voltage across the tube 5 is changing towards its equilibrium value, the grid voltage of tube 44 reverses in sign (with respect to its equilibrium value) before the voltage across the tube 5 has reached its final equilibrium value.

The output voltage of the logarithmic amplifier is taken at terminal 18. When terminal 18 is connected to 51, the change of potential at 18 is of the same sign as the change in potential of the cathode of the tube 5. When terminal 18 is connected to 52, the change of potential at 18 is of opposite sign to the change in potential of the cathode of tube 5.

Tube 53 is operated in an inverted manner. The plate draws no current and the grid draws a current determined by $R_2$. Under these conditions, tube 53 has an amplification constant which is the reciprocal of its ordinary constant. In the exemplary device the potential at $T_{18}$ varied between +5 and +11 volts for a density change of two in the film being scanned.

The various condensers shown in Fig. 2 and not specifically identified hereinbefore are for the purpose of reducing the lag in the means of coupling the plate of one tube to the grid of the next.

The output from 18 is then connected to one of the input terminals of the mixer illustrated in Fig. 4 and in describing the operation of the mixer the plate voltages of the primary tubes 61, 62 and 63 may be referred to as the secondary color voltages. As previously stated, if the color characteristics of the colored inks are known, the proportion of each secondary color voltage which must be subtracted from each of the other secondary color voltages may be calculated by a set of simultaneous equations of values of the various resistances $R_6$ to $R_{11}$ in the bleeder circuits being thus established. The manner in which these subtractions are made in the mixer is as follows: The plate of tube 61 is coupled to the grid of tube 67 through suitable resistances. The grid bias of tube 67 is regulated by a battery and potentiometer, as indicated. With the proper values for the various resistances, the voltage change for the plate of tube 67 is about equal to the voltage change of the tube 61 but is opposite in sign. The plate of tube 67, therefore, becomes more negative when the plate of 61 becomes more positive, and vice versa.

The voltage of color output terminal 25 will increase nearly as much as the plate voltage of tube 62 increases and will decrease by a small fraction of the increase in plate voltage of the tube 61. Thus a proportion of one secondary color voltage is subtracted from another secondary color voltage. In a similar manner, a proportion in each secondary color voltage is subtracted from each other secondary color voltage by means of the tubes 67, 68 and 69 and the various resistances $R_6$ to $R_{11}$.

The other operation performed by the mixer is to select the corrected secondary color voltage corresponding to the least flow of colored ink and to regulate the gray ink voltage so that the flow of this colored ink is 0. This is accomplished by tubes 71, 72, 73 and 66 hereinbefore referred to as the regulator tubes.

An increase in the flow of ink corresponds to terminals 21, 22 and 23 becoming more positive and terminals 24, 25 and 26 becoming more negative. The least negative (or the most positive) of terminals 24, 25 and 26 then corresponds to the least flow of ink. Its voltage is to be adjusted to a constant value corresponding to zero flow of ink by regulating the value of the gray color voltage at 27.

In order to clarify this operation, it may be assumed that the most positive of the color output terminals is 24. As shown in Fig. 4, the grids of tubes 72 and 73 are more negative than that of tube 71. These tubes are then biased so negatively that they draw no plate current and hence do not affect the grid voltage of the regulator tube 66. When the color output terminal 24 is made more positive than a certain predetermined value (150 volts in the specific apparatus here under consideration) the grid of tube 71 is also made more positive. The plate of tube 71 and the grid of tube 66 become more negative. The current through the biasing resistance is then made less and the cathode of tube 66 becomes more negative. At the same time, the cathode of tube 61 becomes more negative and the grid of tube 61 becomes more positive with respect to the cathode.

Finally the plate of tube 61 and terminal 24 become more negative. Since this is in opposition to the original positive change of terminal 24, the changes described act to regulate the voltage of terminal 24 to a predetermined and fixed voltage. This is true even though the grid voltage of tube 61 is changed because the cathode voltage is automatically changed by almost the same amount by tube 66. If, however, the grid voltages of tubes 61, 62 and 63 are changed in such a way that color output terminal 25 becomes more positive than terminals 24 and 26, the regulating action of tube 71 ceases because its grid becomes more negative than cut-off and the plate current drops to 0. The regulating action is then taken over by tube 72 and the voltage of color output terminal 25 is regulated to a constant voltage which is ordinarily the same as the constant voltage to which terminal 24 is normally regulated. This voltage is made to correspond to 0 flow of ink.

The gray colored voltage is the cathode voltage of the regulator tube 66 and is applied to the cathode of tube 65 as shown in Fig. 4. The grid of tube 65 is maintained at a fixed potential. The plate voltage of tube 65 (or of gray ink output terminal 27) is used in controlling the gray ink.

The various color outputs as well as the gray output from terminal 27 then pass through the power amplifiers described in detail hereinbefore and then through the moving coils, such as the coil 112, a separate moving coil being controlled by the current from each color or gray output terminal of the mixer. In the event engravings are to be made, the engraving heads previously described are used instead of the reproducing head.

Although in the description given herein reference has been made to a three-color system, it is to be understood that the devices and methods of the present invention may be used on one or more scanning means receptive to one or more bands of the visible spectrum, the final reproductions being either in monochrome or in any desired number of colors or color components.

When a pump controlled by switch 113 is used, either for supplying ink or a virtually noncompressible viscous liquid, by means of which pressure changes generated by the movement of the head of coil 83 are supplied to the chamber 119 through conduit 114, the capillary 115 should be of a size and length so as to prevent or substantially inhibit a return flow from chamber 110 to conduit 114 and the pressure generated by the pump should be applied smoothly and be of a magnitude just sufficient to refill chamber 110 without creating flow of fluid through capillary 116.

The means for rotating the recharging means such as the circular member 117 may differ materially from those specifically described and shown, but preferably should cause the chambers 118 and 119 to be alternately placed in alignment with the in-conduit 109 in timed relation to the rotation of the reproducing drum 33 so that a new recharging bore or body of ink is introduced with each revolution of the drum or with a definite number of revolutions, thereby causing the change of ink to occur during that period of time or portion of the revolutions of drum 33 during which actual reproduction is not taking place.

Those skilled in the art will also appreciate that a plurality of reproducing devices may be connected to the receiver or power amplifiers associated with the mixer so that a large number of reproductions may be made at the same time from a single scanning device. The system herein described may therefore be employed in commercially reproducing copies of a colored print, kodachrome transparency or the like, or may be used by the military forces in disseminating copies of photographs taken by observation planes and similar operations. The accuracy of the reproductions obtained is influenced by the number of lines or linear inches scanned by the scanning means, the circuits herein described being particularly designed to permit scanning to take place at the rate of 200 to 300 lines per inch with great rapidity, the flow of ink being capable of being started and stopped within a period of time as short as .0001 second, thereby assuring accuracy of reproduction with remarkable definition.

The present invention is not limited to the specific embodiments described herein, which embodiments are simply illustrative of one form of device which has been built and successfully operated. Numerous changes, modifications and adaptations of the invention may be made, and all such changes, uses and modifications as come within the scope of the appended claims are embraced thereby.

I claim:

1. In an apparatus for the transmission and reproduction of pictorial representations in color, including a driven scanning drum adapted to carry three discrete color separation negatives, the combination of: a multiple electrode multiplier photoelectric cell in operative relation with each of said negatives; a scanning light source operably associated with each multiple electrode cell and with its correlated negative; a control photoelectric cell adapted to receive light directly from each scanning light source, and means including such control photoelectric cell and a vacuum tube amplifier associated therewith and the output circuit of the multiple electrode cell automatically adjusting the voltage across the dinodes of the multiple electrode cell to render the anode current thereof equal to the current of the control cell, whereby the output voltage across the dinodes is virtually linear with respect to the density of the negative being scanned.

2. In an apparatus for the transmission and reproduction of pictorial representations, including a driven scanning drum adapted to carry a pictorial representation to be reproduced, the combination of: a multiple electrode multiplier photoelectric cell; a scanning light operably associated with the cell and with the pictorial representation to be reproduced, and means responsive to variations in current output of the anode of the multiple electrode photoelectric cell for adjusting the voltage across the dinodes of such cell to maintain virtually constant the anode current of such cell.

3. In an apparatus for the transmission and reproduction of pictorial representations in color, the combination of: a scanning means adapted to deliver three color outputs, means whereby each output voltage is virtually linear with respect to the density of the pictorial representation being scanned; a mixer circuit having three input terminals, each connected to a separate output of the scanning means, said mixer having three color output terminals and a gray terminal; means interconnecting the color output terminals of said mixer to correct the color output voltages in accordance with the overlapping of absorption characteristics of inks controlled by said color output voltages, and means for varying the output voltage at the gray terminal of said mixer in proportion to the magnitude of the least of the corrected color output voltages.

4. In an apparatus for the transmission and reproduction of pictorial representations in color, the combination of: a scanning means adapted to deliver three color outputs, means whereby each output voltage is virtually linear with respect to the density of the pictorial representation being scanned; a mixer circuit having three input terminals, each connected to a separate output of the scanning means, said mixer having three color output terminals and a gray output terminal; means interconnecting the color output terminals of said mixer for correcting the color output voltages in accordance with the overlapping of absorption characteristics of inks controlled by said color output voltages, and an amplifier connected to each output terminal of the mixer, said amplifier including inverse feedback means of the resistance type, the voltage across the resistance being susceptible to change over a wide frequency range in accordance with the plate current changes of the output tube of such amplifier.

5. In an apparatus for the transmission and reproduction of pictorial representations in color, the combination of: a scanning means adapted to deliver three color outputs, means whereby each output voltage is virtually linear with respect to the density of the pictorial representation being scanned; a mixer circuit having three input terminals, each connected to a separate output of the scanning means, said mixer having three color output terminals and a gray output terminal; means interconnecting the color output terminals of said mixer for correcting the color output voltages in accordance with the overlapping of absorption characteristics of inks controlled by said color output voltages; an amplifier connected to each output terminal from the mixer, each amplifier including inverse feedback means and an output terminal, and a reproducing head including means for generating a magnetic field and four movable coils in such field, each of said coils being connected to the output terminal of one of said amplifiers, and means to control the flow of ink in said reproducing head, said control means being operated by said four movable coils.

6. In an apparatus for the transmission and reproduction of pictorial representations in color, a mixer circuit adapted to receive three separate input color voltages, said mixer including a primary tube having its control grid connected to each of the input terminals, an amplifier tube and a regulator tube, the cathodes of said primary tubes being connected to a common grey voltage line and to the cathodes of said amplifier tube and regulator tube, a reversing tube connected to each of said primary tubes, the plate of each of said primary tubes being resistance coupled to the grid of its reversing tube, a color regulator tube resistance coupled to the plate circuit of each of the primary tubes, said color regulator tubes being interconnected by common plate circuits, the plate circuit of said color regulator tubes being coupled to the grid of the first-named regulator in the grey voltage circuit, each of the three color voltage output terminals of said mixer being connected to the plate of its respective primary tube and by bleeder circuits to the reversing tubes of the other primary tubes, and means in said bleeder circuits to correct the color output voltages at the color output terminals in accordance with the overlapping of absorption characteristics of inks controlled by said color output voltages.

7. In combination with the apparatus specified in claim 6, three separate scanning means, each including an amplifier, photoelectric cell and means to deliver an output voltage which is linear with respect to the density of the pictorial representation being scanned.

8. In combination with the apparatus defined in claim 6, a scanning means operably associated to the input terminals of the mixer circuit, said scanning means including a multiple electrode photoelectric cell, a control photoelectric cell and a vacuum tube amplifier associated therewith and the output circuit of the multiple electrode cell; means associated with said control photoelectric cell to compensate for variations in density of scanning light source, the scanning means being adapted to deliver an output voltage to the input terminals of the mixer circuit, which output voltage is linear with respect to the density of the representation being reproduced.

9. In an apparatus for the transmission and reproduction of pictorial representations in color, including a scanning means adapted to deliver three color outputs, the combination of: a mixer circuit having three input terminals each connected to a separate color output of the scanning means, said mixer having three color output terminals and a gray output terminal; means interconnecting the color output terminals of said mixer for correcting the color output voltages thereof in accordance with the overlapping of absorption characteristics of inks controlled by said corrected color output voltages, and means for varying the output voltage at the gray output terminal of said mixer in proportion to the magnitude of the least of the corrected output voltages.

10. A mixer circuit adapted for use in the transmission and reproduction of pictorial representations, said mixer circuit being adapted to receive three separate input color voltages, said mixer including a primary tube having its control grid connected to each of the input terminals, an amplifier tube, a gray regulator tube, the cathodes of said primary tubes being connected to a common gray voltage line and to the cathodes of said amplifier tube and gray regulator tube; a color regulator tube resistance-coupled to the plate circuit of each of the primary tubes, said color regulator tubes being interconnected by a common plate circuit, the plate circuit of said color regulator tubes being coupled to the grid of the first named gray regulator in the gray voltage circuit, each of the three color voltage output terminals of said mixer being connected to the plate of its respective primary tube.

11. In a method of reproducing pictorial representations in color, the steps of converting a color sensation upon a pictorial representation to be reproduced into electrical energy, controlling the supply and rate of feed of ink in accordance with such energy, and modifying such electrical energy in accordance with the absorption characteristics of inks to be controlled by such energy.

12. In a method of reproducing pictorial representations in color, the steps of: converting a plurality of bands of the visible spectrum, embodied in the pictorial representation being reproduced, into separate electrical energies; controlling the rate of feed of colored inks through nozzles by each of said electrical energies in accordance with the differences between said electrical energies and controlling the rate of feed of a gray ink through a nozzle in proportion to the least of said electrical energies.

13. In a method of reproducing pictorial representations in color, the steps of: converting a plurality of bands of the visible spectrum, embodied in the pictorial representation being reproduced, into separate electrical energies adapted for use in the control of feed of colored inks through nozzles; modifying the magnitude of said energies in accordance with the overlapping of absorption characteristics of inks to be controlled by such modified energies; controlling the rate of feed of colored inks through nozzles in accordance with the differences between electrical energies so modified, and controlling the rate of feed of a gray ink through a nozzle in proportion to the least of said modified electrical energies.

14. The method of making three chromatic image components and a gray image component from a colored subject comprising: directing three different chromatic components of a colored subject to three separate photo-electric receptors, adjusting each receptor to obtain a response linear with respect to the density of the colored subject; utilizing said responses to obtain a gray output voltage varying in proportion to the magnitude of the least response of the receptors to provide a gray image component; converting each of said responses into an output whose voltage is varied in accordance with the difference between the least of the responses and the response of the chromatic component being converted into an output, and utilizing such outputs to provide three chromatic image components.

15. In a method of forming reproductions in color, the steps of: directing three different chromatic components of a colored subject to three separate photoelectric receptors, adjusting each receptor to obtain a response linear with respect to the density of the colored subject, and converting each of said adjusted responses into an output whose voltage is varied in accordance with the difference between each of said responses and a gray output voltage, the gray output voltage being of a magnitude adapted to reduce the least of said responses to a substantially fixed level.

16. In a method of forming reproductions in color, the steps of: directing three different chromatic components of a colored subject to three separate photoelectric receptors, adjusting each receptor to obtain a response linear with respect to the density of the colored subject, converting each of said adjusted responses into an output whose voltage is varied in accordance with the difference between each of said responses and a gray output voltage, the gray output voltage being of a magnitude adapted to reduce the least of said responses to a substantially fixed level, and utilizing said outputs in the formation of chromatic image components whereby said components combine to form a reproduction of the colored subject.

17. In an electro-optical system, photoelectric scanning means for generating a signal corresponding to a color component, and means for modifying the signal to render the same linear with respect to the logarithmic intensity of light transmitted to the photoelectric means.

18. In an electro-optical system, a scanning means including a multi-electrode multiplier tube provided with anode, cathode and dinodes, and means, responsive to variations of current output of the anode, for adjusting the voltage across the dinodes whereby the output voltage of the tube is virtually linear with respect to the density of the representation being scanned.

19. In an electro-optical system, three incoming channels each carrying a signal corresponding to a color component of a subject; means for converting each of said signals into an uncorrected color voltage which corresponds to a logarithmic function of the signal; means for subtracting a gray voltage from each of the three uncorrected color voltages to produce three secondary color voltages; means for subtracting a portion of each secondary color voltage from each of the other two secondary color voltages to give three corrected secondary color voltages; and means for obtaining a gray signal voltage from the corrected secondary color voltages.

20. In an electro-optical system, three incoming channels each carrying a signal corresponding to a color component of a subject; means for converting each of said signals into an uncorrected color voltage which corresponds to a logarithmic function of the signal; means for subtracting a gray voltage from each of the three uncorrected color voltages to produce three secondary color voltages; means for subtracting a portion of each secondary color voltage from each of the other two secondary color voltages to give three corrected secondary color voltages; and means for obtaining a gray signal voltage from the corrected secondary color voltages, said means being associated with the means for subtracting gray voltage from the uncorrected color voltages, said gray signal voltage being adapted to produce a correction sufficient to reduce the least of the three corrected secondary voltages to an inoperative, substantially fixed level.

NORMAN R. GUNDERSON.